United States Patent
Wu

(10) Patent No.: US 7,070,285 B2
(45) Date of Patent: Jul. 4, 2006

(54) BLANKING DEVICE AND PROJECTOR HAVING THE SAME

(75) Inventor: Tsung-Hsun Wu, TaoYuan (TW)

(73) Assignee: Benq Corporation, Tao Yuan (TW)

( * ) Notice: Subject to any disclaimer, the term of this patent is extended or adjusted under 35 U.S.C. 154(b) by 49 days.

(21) Appl. No.: 10/910,316

(22) Filed: Aug. 4, 2004

(65) Prior Publication Data

US 2005/0030493 A1   Feb. 10, 2005

(30) Foreign Application Priority Data

Aug. 5, 2003   (TW) .............................. 92214170 U

(51) Int. Cl.
*G03B 21/14* (2006.01)

(52) U.S. Cl. ..................... 353/97; 359/738; 353/122

(58) Field of Classification Search .................. 353/97, 353/88, DIG. 6, 122; 359/722, 723, 738
See application file for complete search history.

(56) References Cited

U.S. PATENT DOCUMENTS

| 5,537,166 | A  | * | 7/1996 | Keelan et al. ................. 353/97 |
| 5,924,783 | A  | * | 7/1999 | Jones ........................... 353/97 |
| 6,637,894 | B1 | * | 10/2003 | Dewald et al. ................ 353/97 |
| 6,648,476 | B1 | * | 11/2003 | Watanabe et al. .............. 353/97 |
| 6,942,349 | B1 | * | 9/2005 | Inamoto ........................ 353/97 |
| 2005/0024605 | A1 | * | 2/2005 | Hamada ...................... 353/119 |
| 2005/0122721 | A1 | * | 6/2005 | Hori ............................ 362/268 |
| 2005/0151933 | A1 | * | 7/2005 | Tsai et al. ...................... 353/57 |
| 2005/0219474 | A1 | * | 10/2005 | Hara et al. ..................... 353/88 |
| 2005/0259230 | A1 | * | 11/2005 | Yang et al. .................... 353/97 |

* cited by examiner

*Primary Examiner*—William C. Dowling
(74) *Attorney, Agent, or Firm*—Birch, Stewart, Kolasch & Birch, LLP

(57) ABSTRACT

The present invention is to provide a blanking device of projector, comprising a blanking piece having at least one transparent part such that by installing the blanking piece at the optical path of the projector, it is possible to blank the projection of the projector and block most of projecting light, while a small part of the projecting light may still pass through the transparent part of the projector and project out.

14 Claims, 4 Drawing Sheets

BLANKING DEVICE AND PROJECTOR HAVING THE SAME

This Nonprovisional application claims priority under 35 U.S.C. § 119(a) on Patent Application No(s). 092214170 filed in Taiwan, Republic of China on Aug. 5, 2003, the entire contents of which are hereby incorporated by reference.

FIELD OF THE INVENTION

The present invention relates to a blanking device of projector, and more particularly, to a blanking device of projector having local blocking function.

BACKGROUND OF THE INVENTION

Usually, projector is used in cooperation with writing on a whiteboard for clearly presentation. Therefore, when the whiteboard is used, the cooperating projector must be blanked to avoid the projecting light from interfering with the illustration shown on the whiteboard. Although "blanking" is used for addressing the foregoing operation, the operation of blanking is performed in a digital projector by using optical chassis to "divert" the projecting light from the intended projecting direction. Usually, the blanked projecting light is reflected and diverted toward the upper lid or the lower lid of the optical chassis, such that the projecting light won't be projected out from the lens of the projector. However, since the projecting lens is totally blocked out while blanking the projector of prior arts, the user is unable to determine whether the projector is under operational mode and will start the projector again. The situation not only is inconvenient for operation, but also will cause malfunction of the projector.

SUMMARY OF THE INVENTION

In view of the shortcoming of prior arts, the primary objective of the present invention is to provide a blanking device of projector, and the characteristic thereof is being able to block light locally such that not only the usage of whiteboard will not be affected, but also it is convenient for the user to determine whether the project is still under normal operation mode.

Following drawings are cooperated to describe the detailed structure and its connective relationship according to the invention for facilitating your esteemed members of reviewing committee in understanding the characteristics and the objectives of the invention.

DETAILED DESCRIPTION OF THE INVENTION

Figure 1:
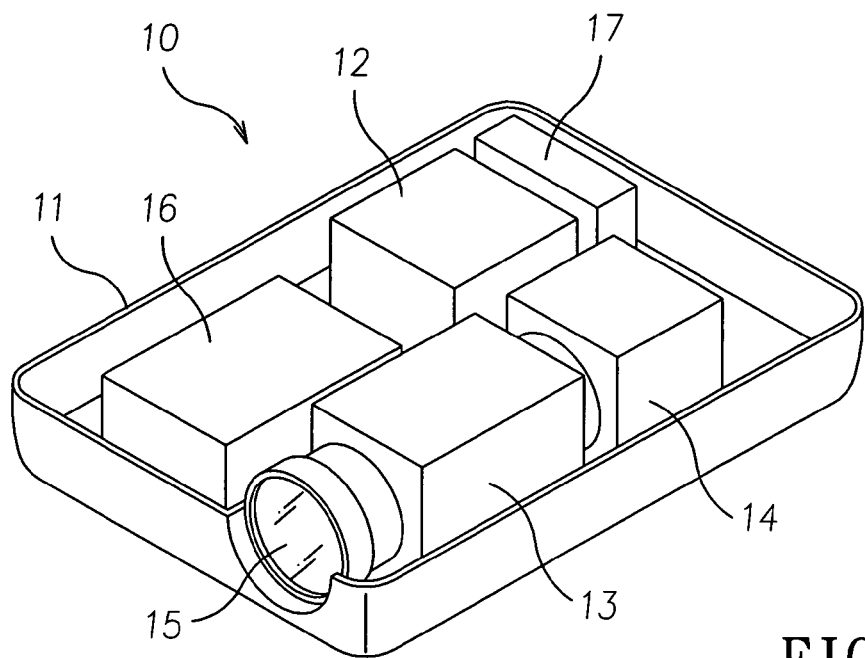
FIG. 1 is a schematic drawing showing the interior structure of a digital projector according to the prior arts.
Figure 2:
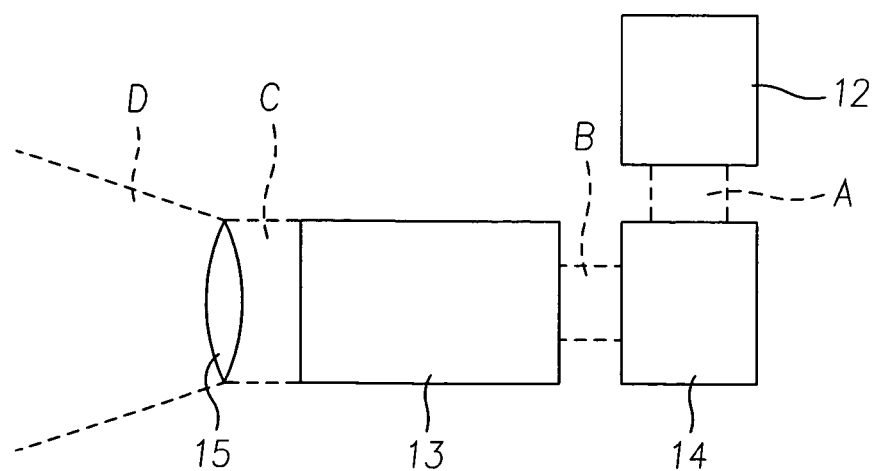
FIG. 2 is a schematic diagram showing the optical path of a digital projector according to the prior arts.
Figure 3:
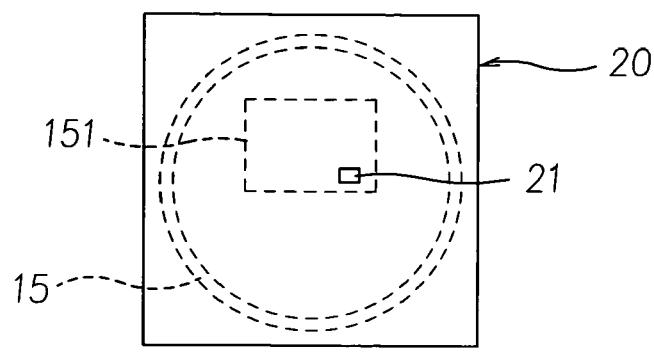
FIG. 3 is a diagram showing a lens of the present invention.

Please refer to FIG. 1 and FIG. 2, a digital projector 10 is applied as an illustration for describing the operation principle of the present invention. The projector 10 has a casing 11 and inside thereof is mainly arranged with a casing 11, a light source 12, a digital micro-mirror device (DMD) 14, an optical chassis 13, a lens 15, a control circuit 16, and a radiator 17. The projecting light radiated from the light source 12 is reflected using the optical chassis 13 and is discharged toward the DMD 14 for reflection control, and thereafter the projecting light is projected onto a whiteboard or a screen through the lens 15, such that a continuous path of projection constituted by optical paths A, B, C, and D is thereby formed. By the characteristic of the projection path, the present invention provides a blanking device whose operational principle is to arrange a blanking device at any one of the aforesaid optical path A, B, C, and D so as to block most of the projecting light and let small part of the projecting light to pass through. There are many embodiments for implementing the blanking device of projector. As shown in FIG. 3, the blanking piece 20 is arranged in front of the lens 15 and the size of the blanking piece 20 covers the lens 15 completely, moreover, a transparent part 21 is arranged in the blanking piece 20 corresponding to the effective projection zone 151 of the lens 15. In this embodiment, the transparent part 21 is arranged at the right lower corner of the effective projection zone 151. Of course, the transparent part 21 also may be arranged at the left lower corner or other corners of the effective projection zone 151 and can be more than one transparent part 21 existed. However, in general that the transparent part 21 is arranged at the right lower corner of the effective projection zone 151, and the number thereof is no more than one. In addition, when the projector 10 is under a blanking mode, the radiator 17 is activated for enhancing the heat dissipation.

Figure 4:
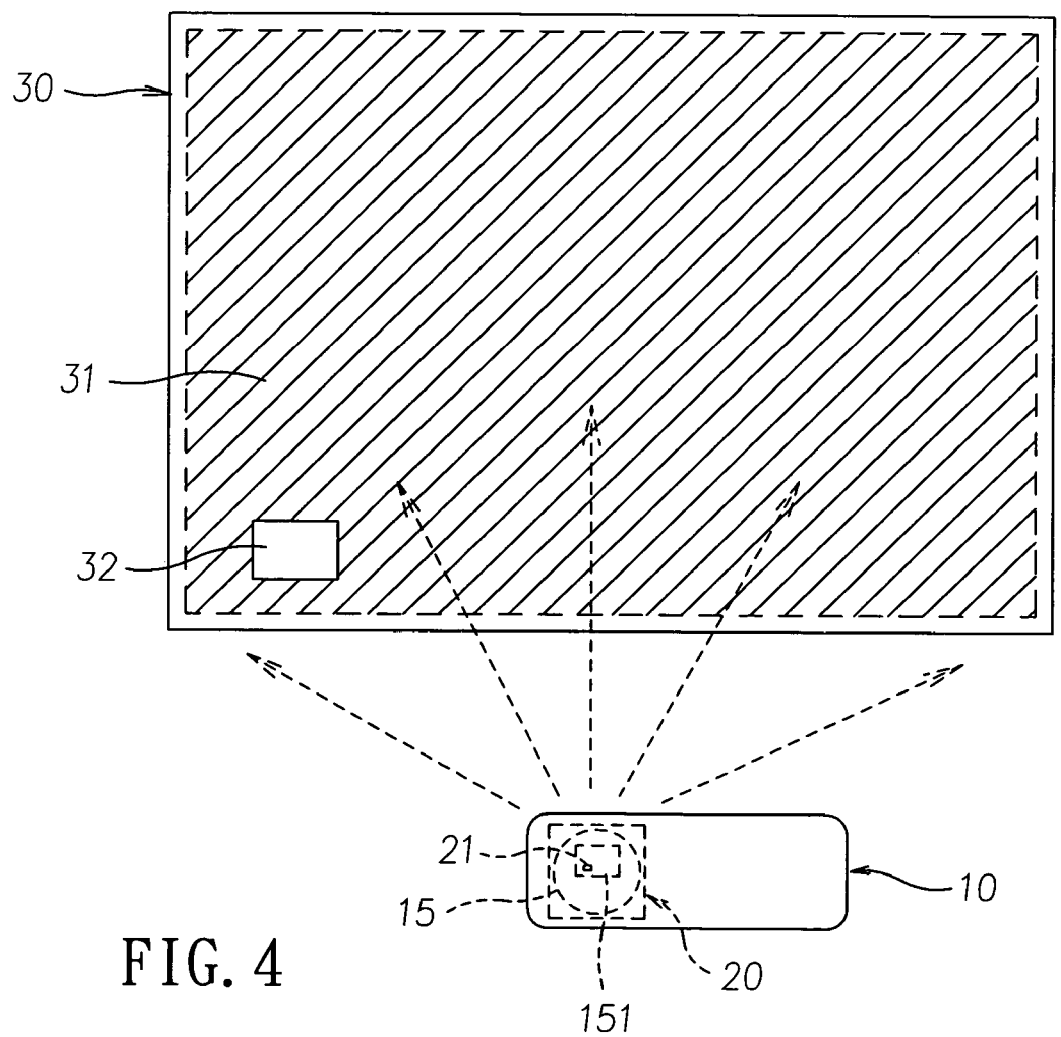
FIG. 4 is a schematic diagram showing a projector in blanking mode according to the present invention.

Please refer to FIG. 4, the projector 10 is arranged in front of the whiteboard 30 with an appropriate distance. Since the blanking piece 20 is arranged in front of the lens 15, most of the projecting light is blocked, and only a small part of the projecting light can still pass through the transparent part 21 of the blanking piece 20 and project out. Therefore, most area of the whiteboard 30 is shown as dark zone 31 (i.e. the area covered with oblique lines), and the only bright zone 32 is located at the left lower corner of the whiteboard (which is mirror to the right lower corner of the effective projection zone 151). Hence, it is advantageous for the user to determine whether the projector 10 is under operation mode or not by the displaying of the bright zone 32.

Since there are many kinds of method for combining the blanking piece 20 and the projector 10 and also many kinds of operation method of the blanking piece 20, several preferred embodiments are described thereinafter.

Figure 5:
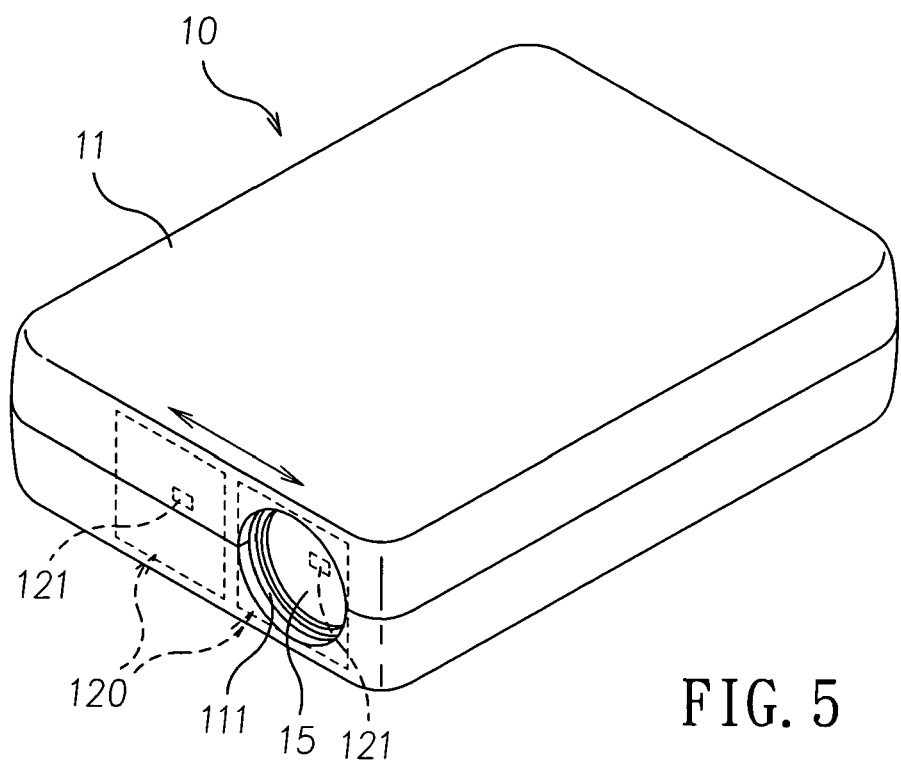
FIG. 5 is a preferred embodiment showing a combination of a blocking piece with the casing of a projector in accordance to the present invention.

Please refer to FIG. 5. As shown, the blanking piece 120 is a single flat piece having a transparent part 121 arranged within, and the blanking piece 120 is inset in a chute 111 arrange at the casing 11 of the projector 10. The blanking piece 120 moving in the chute 111 is capable of covering or uncovering the lens 15. When the blanking piece 120 covers the lens 15, most of the projecting light is blocked and only a small part of the projecting light is projected out from the transparent part 121, such that the projection effect as shown in FIG. 4 is formed. The method for driving the blanking piece 120 to move in the chute 111 can be by hands or by remote control using a remote control circuit arranged in the projector 10. To enhance the smooth motion of the blanking piece 120, bearings or gears can be arranged inside the chute 111. Such prior arts will not be described herein in detail.

Figure 6:
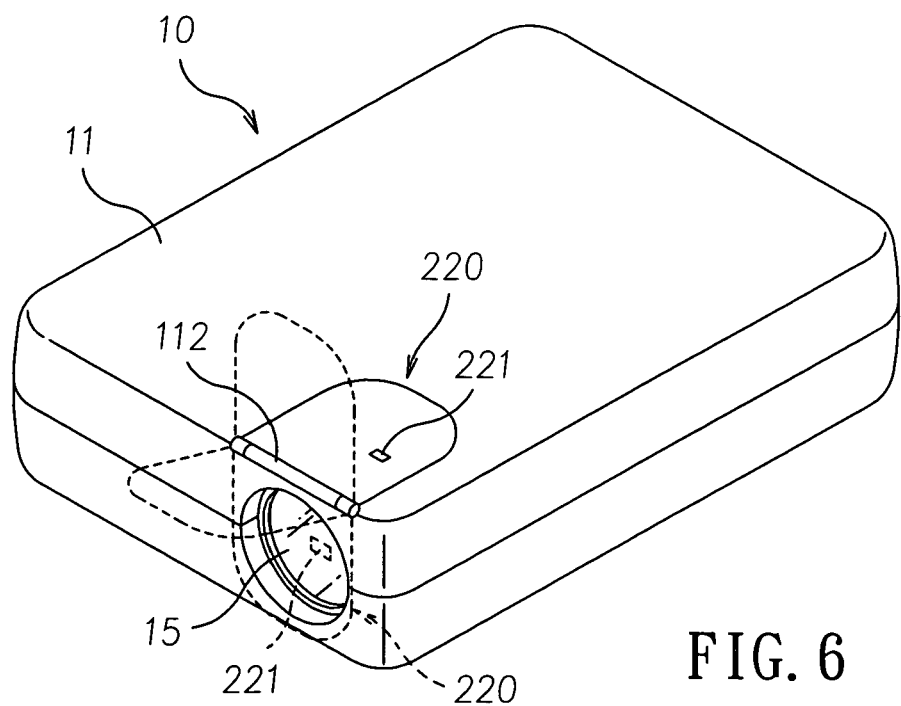
FIG. 6 is another preferred embodiment showing a combination of a blocking piece with the casing of a projector in accordance to the present invention.

In another embodiment shown in FIG. 6, the blanking piece 220 is also a single flat piece having a transparent part 121 arranged within, and the blanking piece 220 is pivotally connected to the casing 11 of the projector 10 using the pivotal axis 112, such that the blanking piece 220 can be flipped over by taking the pivotal axis 112 as center to enable the blanking piece 220 to cover or uncover the lens 15. When the blanking piece 220 covers the lens 15, most of the projecting light is blocked and only a small part of the projecting light is projected out from the transparent part 121, such that the projection effect as shown in FIG. 4 is formed. The flipping of the blanking piece 220 may be operated by hands or by remote control using a remote control circuit arranged in the projector 10.

Figure 7:
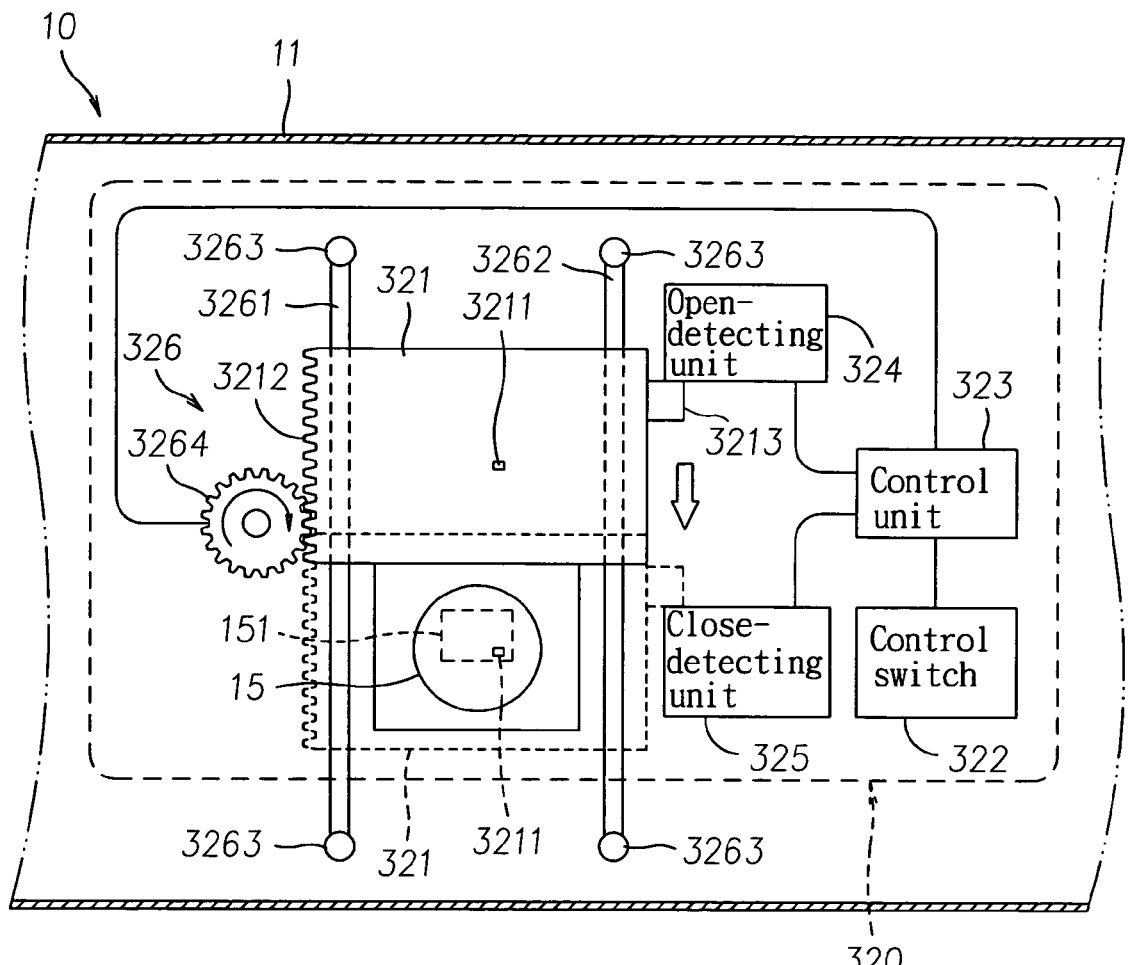
FIG. 7 is a schematic diagram showing the structure of a blocking piece module according to the present invention.

Please refer to FIG. 7, which is a schematic diagram showing the structure of a blocking piece module according to the present invention. As shown, a blanking piece module 320 is arranged inside the casing 11 of the projector 10. The blanking piece module 320 mainly comprises a blanking piece 321, a control switch 322, a control unit 323, an open-detecting unit 324, and a close-detecting unit 325. The blanking piece 321 cooperating with a transmission device 326 may cover or uncover the lens 15. The blanking piece 321, the control switch 322, the open-detecting unit 324, the close-detecting unit 325, and transmission device 326 are all coupled to the control unit 323. By activating the control switch 322, the power source is connected to activate the control unit 323.

The transmission device 326 includes: two guiding rods 3261, 3262 arranged respectively at two sides of the lens 15, which are in parallel to each other and are fixed inside the casing 11 using fixing pillars 3263; a gear 3264 arranged at one side of the blanking piece 321; wherein, there are teeth 3212 arranged at the side edge of the blanking piece 321 corresponding to the gear 3264, thus, when the gear 3264 is rotated in clockwise direction or in counterclockwise direction, the teeth 3212 will bring along the blanking piece 321 to make a reciprocating motion coaxial to the guiding rods 3261, 3262, such that the blanking piece 321 may cover or uncover the lens 15. Similarly, a transparent part 3211 is arranged in the blanking piece 321 corresponding to the effective projection zone 151 of the lens 15.

Furthermore, a protrusion 3213 is arranged at a designated position of one side of the blanking piece 321 facing the open-detecting unit 324 and the close-detecting unit 325. When the blanking piece 321 is not covering the lens 15, that is, when the blanking piece 321 is located on top of the lens 15, the protrusion 3213 may come into contact with the open-detecting unit 324 so as to enable the open-detecting unit 324 to detect that the blanking piece 321 has already reached the open position and to issue an stop-opening signal to the control unit 323 accordingly for stopping the rotation of the gear 3264 and thereafter the moving of the blanking piece 321; when the blanking piece 321 is lowered down to cover the lens 15, the protrusion 3213 may come into contact with the close-detecting unit 325 so as to enable the close-detecting unit 325 to detect that the blanking piece 321 has already reached the close position and to issue a stop-closing signal to the control unit 323 accordingly for stopping the rotation of the gear 3264 and thereafter the moving of the blanking piece 321. In brief, the blanking piece 321 of the present invention is installed with teeth 3212 capable of meshing with the gear 3264, such that the gear 3264 can bring along the blanking piece 321 to move to the position that covers or uncovers the lens 15. When the blanking piece 220 covers the lens 15, most of the projecting light is blocked and only a small part of the projecting light is projected out from the transparent part 3211, such that the projection effect as shown in FIG. 4 is formed. The blanking piece module 320 may further include remote control circuit for providing the user with remote control capability.

Figure 8A:
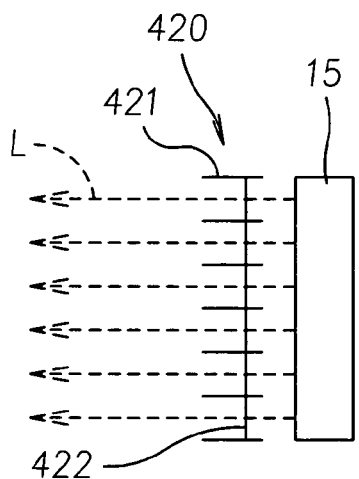
FIG. 8A and FIG. 8B are operating diagrams depicting another preferred embodiment of the blanking device according to the present invention.
Figure 8B:
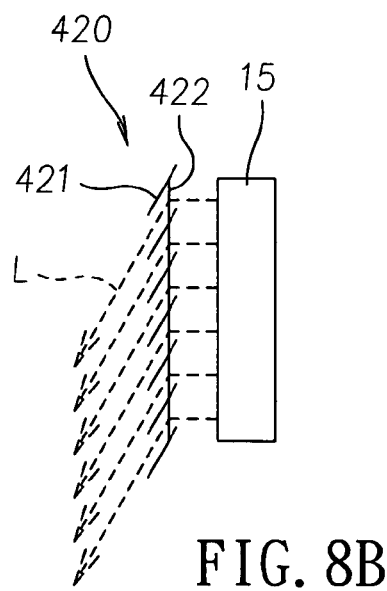

Please refer to FIG. 8A and FIG. 8B. The blanking device 420 of the embodiment is a shutter-structured device, wherein plural blanking pieces 421 are connected in series to a fixing axis 422, such that the blanking pieces 421 may be flipped simultaneously using the fixing axis 422 as an axial center. By changing the flipping angles of the blanking pieces 421, the space provided for the projecting light L to be discharged or the projecting direction of the projecting light L will be changed. As shown in FIG. 8A, the blanking pieces 421 are flipped upward simultaneously to a horizontal position for projecting out the projecting light L horizontally between blanking pieces 421 such that the projecting light L is projected out in horizontal direction. When the blanking pieces 421 are flipped downward simultaneously to a designated angle, the direction of the projecting L will be changed due to the block of the blanking pieces 421. When the blocking pieces 421 have high reflectivity, the projecting light L will be reflected to other angles totally. When the reflectivity of the blocking pieces 421 is low, part of the projecting light L will be diminished, and only part of the projecting light L will be reflected. In any case, the point of the present invention is to control the flipping angle of the blanking pieces 421 of the blanking device so as to change the projecting direction of the projecting light. In general, when the projector is projecting, the projecting direction of the projecting light L will be in horizontal direction or little higher than horizontal. It is preferable to deviate the projecting light toward the bottom of the screen. Of course, the blanking pieces 421 may be flipped to another angle to enable the projecting light to be deviated to other direction. In this regard, after the projector is being blanked, the projecting light L will still be projected toward the lower portion of the whiteboard or the screen that can help the user to determine whether the projector is under operation mode or not. It is also possible to arrange a transparent part (not shown in the figures) of appropriate size or number on the blanking pieces 421, such that a small part of projecting light may be projected through the transparent part and onto the whiteboard or the screen for forming the projection effect as shown in FIG. 4. The blanking device 420 can be controlled by hands or by remote control using a remote control circuit arranged in the projector 10 to flip the blanking pieces 421.

In summary, the present invention provides a blanking device arrange at the optical path of a projection. The device can block most of the projecting light and only project out a small part of the projecting light, or can change the direction of projecting light, such that the user of a projector may easily determine whether the projector is under operation mode or not. The present invention is not only adapted for digital projector, but also adapted for other kinds of projector. Digital projector is only taken as an example for the preferred embodiment of the present invention and can not be used as a limitation for the scope of the invention.

Therefore, the aforementioned description is just several preferable embodiments according to the invention and, of course, can not limit the executive range of the invention, so any equivalent variation and modification made according to the claims claimed by the invention are all still belonged to the field covered by the patent of the present invention. Please your esteemed members of reviewing committee examine the present application in clear way and grant it as a formal patent as favorably as possible.

What is claimed is:

1. A blanking device of a projector, the projector generating a projecting light passing through an optical path, the blanking device comprising:
   a blanking piece having at least a transparent part, arranged in the optical path and positioned at a lower portion of an effective projection zone;
   wherein the blanking piece blocks most of the projecting light in the optical path, and a part of the projecting light is projected through the transparent part.

2. The blanking device according to claim 1, wherein the transparent part of the blanking piece is selectively positioned at a left lower corner and a right lower corner of the effective projection zone.

3. A blanking device of a projector, the projector generating a projecting light passing through an optical path, the blanking device comprising:
   a blanking piece having at least a transparent part arranged in the optical path and pivotally arranged on a casing of the projector for flipping the blanking piece by taking a pivotal axis as a center;
   wherein the blanking piece blocks most of the projecting light in the optical path, and a part of the projecting light is projected through the transparent part.

4. A blanking device of a projector, the projector generating a projecting light passing through an optical path, the blanking device comprising:
   a blanking piece having at least a transparent part, arranged in the optical path and arranged on a casing of the projector in a way that the blanking piece is movable in a reciprocating manner;
   wherein the blanking piece blocks most of the projecting light in the optical path, and a part of the projecting light is projected through the transparent part.

5. The blanking device according to claim 1, wherein the blanking device is a blanking piece module, the blanking piece module further comprising:
   a blanking piece having at least a transparent part, arranged in the projector in a way that the blanking piece is movable in a reciprocating manner;
   a control switch;
   an open-detecting unit, for detecting the open position of the blanking piece;
   a close-detecting unit, for detecting the close position of the blanking piece; and
   a transmission device, for driving the blanking piece;
   wherein, the transmission device may be activated by the control switch to move the blanking piece, and when the blanking piece comes into contact with the open-detecting unit, the open-detecting unit will stop the transmission device and therefore enable the blanking piece to stop moving such that the blanking piece will not cover the projecting light and let the projecting light to be projected to the outside; when the blanking piece comes into contact with the close-detecting unit, the close-detecting unit will stop the transmission device and therefore enable the blanking piece to stop moving such that the blanking piece will block most of the projecting light and let a small part of the projecting light to be projected through the transparent part of the blanking piece.

6. The blanking device according to claim 5, wherein the blanking piece module further comprises a control unit coupled to the blanking piece, the control switch, the open-detecting unit, the close-detecting unit, and the transmission device, which is adapted for receiving an open signal, a close signal, a stop-opening signal, and a stop-closing signal.

7. The blanking device according to claim 5, wherein the transmission device comprises a gear and teeth arranged at the side of the blanking piece corresponding to the gear, wherein the teeth is meshed with the gear to bring along the blanking piece to move while the gear is rotating.

8. The blanking device according to claim 5, wherein the transmission device comprises a guiding device, wherein the blanking piece is driven by the transmission device to move along the guide device in a reciprocating manner.

9. The blanking device according to claim 8, wherein the guiding device is composed of two guiding rods parallel to each other.

10. The blanking device according to claim 5, wherein the blanking piece has a protrusion for contacting the open-detecting unit at a time and the close-detecting unit at another time.

11. The blanking device according to claim 5, wherein the blanking piece module further comprises a remote control circuit for remote controlling the transmission device.

12. A blanking device of a projector, the projector generating a projecting light passing through an optical path, the blanking device comprising:
   a blanking piece having at least a transparent part, arranged in the optical path and constructed by connecting a plurality of blanking pieces in series onto a fixing axis, and the plurality of blanking pieces can be flipped simultaneously to a predefined angle, such that the blanking device arranged in the optical path will deviate the direction of projecting light by changing the angle of the flipped plural blanking pieces;
   wherein the blanking piece blocks most of the projecting light in the optical path, and a part of the projecting light is projected through the transparent part.

13. The blanking device according to claim 12, wherein the angles of the plural blanking pieces are adjustable by hands or by a driving device.

14. The blanking device according to claim 13, wherein the driving device is a remote control circuit cooperating with a remote controller.

* * * * *